(12) United States Patent
Zitzmann et al.

(10) Patent No.: US 10,663,352 B2
(45) Date of Patent: May 26, 2020

(54) SENSOR ASSEMBLY FOR A RESISTANCE THERMOMETER, RESISTANCE THERMOMETER AND METHOD OF PRODUCING A SENSOR ASSEMBLY

(71) Applicant: TE Connectivity Sensors Germany GmbH, Dortmund (DE)

(72) Inventors: Heinrich Zitzmann, Lauf a.d. Pegnitz (DE); Horst Sirtl, Lauf a.d. Pegnitz (DE); Dirk Nusse, Dortmund (DE)

(73) Assignee: TE CONNECTIVITY SENSORS GERMANY GMBH, Dortmund (DE)

(*) Notice: Subject to any disclaimer, the term of this patent is extended or adjusted under 35 U.S.C. 154(b) by 479 days.

(21) Appl. No.: 15/366,249

(22) Filed: Dec. 1, 2016

(65) Prior Publication Data
US 2017/0153147 A1    Jun. 1, 2017

(30) Foreign Application Priority Data

Dec. 1, 2015 (DE) .................. 10 2015 223 949

(51) Int. Cl.
| | | |
|---|---|---|
| *G01K 7/00* | (2006.01) | |
| *G01K 1/14* | (2006.01) | |
| *H01C 7/02* | (2006.01) | |
| *G01K 7/18* | (2006.01) | |

(52) U.S. Cl.
CPC .............. *G01K 1/14* (2013.01); *G01K 7/18* (2013.01); *H01C 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,831,512 | A * | 11/1998 | Wienand | G01K 7/183 338/25 |
| 5,846,891 | A * | 12/1998 | Son | C04B 35/117 501/127 |
| 6,353,381 | B1 | 3/2002 | Dietmann et al. | |
| 8,597,791 | B2 | 12/2013 | Polak | |
| 2002/0000598 | A1* | 1/2002 | Kang | C23C 16/34 257/301 |
| 2004/0040843 | A1* | 3/2004 | Weyl | G01N 27/4077 204/424 |
| 2012/0079900 | A1* | 4/2012 | DeWyse | G01N 33/20 73/866 |
| 2014/0153613 | A1 | 6/2014 | Wienand et al. | |

OTHER PUBLICATIONS

German Office Action, dated Sep. 6, 2016, 5 pages.

* cited by examiner

*Primary Examiner* — Lisa M Caputo
*Assistant Examiner* — Nasir U. Ahmed

(57) ABSTRACT

A sensor assembly for a resistance thermometer is disclosed. The sensor assembly comprises a substrate, a measuring structure disposed on the substrate, and a cover layer disposed on the measuring structure. The cover layer has a plurality of first layers formed of a first material and a plurality of second layers formed of a second material. The first and second layers are disposed over one another such that a thermal coefficient of expansion of the cover layer is adapted to a thermal coefficient of expansion of the measuring structure.

13 Claims, 2 Drawing Sheets

SENSOR ASSEMBLY FOR A RESISTANCE THERMOMETER, RESISTANCE THERMOMETER AND METHOD OF PRODUCING A SENSOR ASSEMBLY

CROSS-REFERENCE TO RELATED APPLICATIONS

This application claims the benefit of the filing date under 35 U.S.C. § 119(a)-(d) of German Patent Application No. 102015223949.7, filed on Dec. 1, 2015.

FIELD OF THE INVENTION

The present invention relates to a sensor assembly, and more particularly, to a sensor assembly for a resistance thermometer.

BACKGROUND

Resistance thermometers known in the art have a measuring structure made of platinum, which is arranged on a substrate. The measuring structure is in turn covered by a cover layer. The cover layer and the measuring structure in known resistance thermometers have different thermal coefficients of expansion. When known resistance thermometers are stressed by abrupt changes in temperature, alterations and damage, which act on the entire measuring structure and falsify the measurement values as a result, can occur at the boundary layer between the cover layer and the measuring structure. Consequently, a temperature measurement made by the resistance thermometer becomes more unreliable over time.

SUMMARY

An object of the invention, among others, is to provide a sensor assembly of a resistance thermometer which does not suffer alterations or damage at a boundary layer and provides stable measurements in the long term. The disclosed sensor assembly comprises a substrate, a measuring structure disposed on the substrate, and a cover layer disposed on the measuring structure. The cover layer has a plurality of first layers formed of a first material and a plurality of second layers formed of a second material. The first and second layers are disposed over one another such that a thermal coefficient of expansion of the cover layer is adapted to a thermal coefficient of expansion of the measuring structure.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
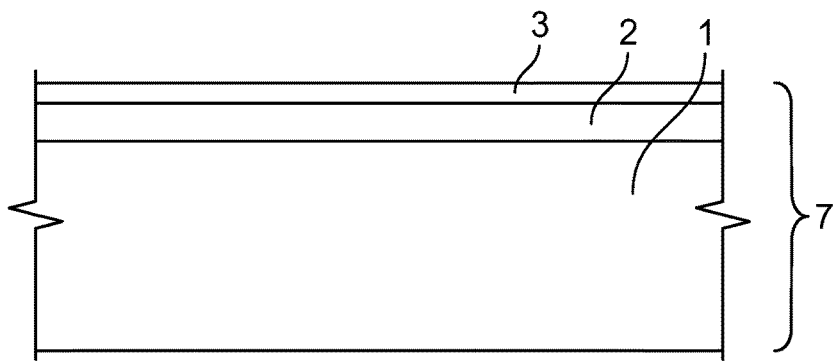
FIG. 1 is a sectional view of a sensor assembly according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

A sensor assembly 7 for a resistance thermometer according to the invention is shown generally in FIG. 1. The sensor assembly 7 comprises a substrate 1 on which there is arranged a measuring structure 2 made of platinum. The measuring structure 2 is in turn covered by a cover layer 3.

The substrate 1 serves as a support for the measuring structure 2, which can be very fragile. The measuring structure 2, in an embodiment of the invention, is a meandering structure. The resistance of the measuring structure 2 changes depending on the temperature. This change in resistance can be measured and the temperature can be deduced from this.

Figure 2:
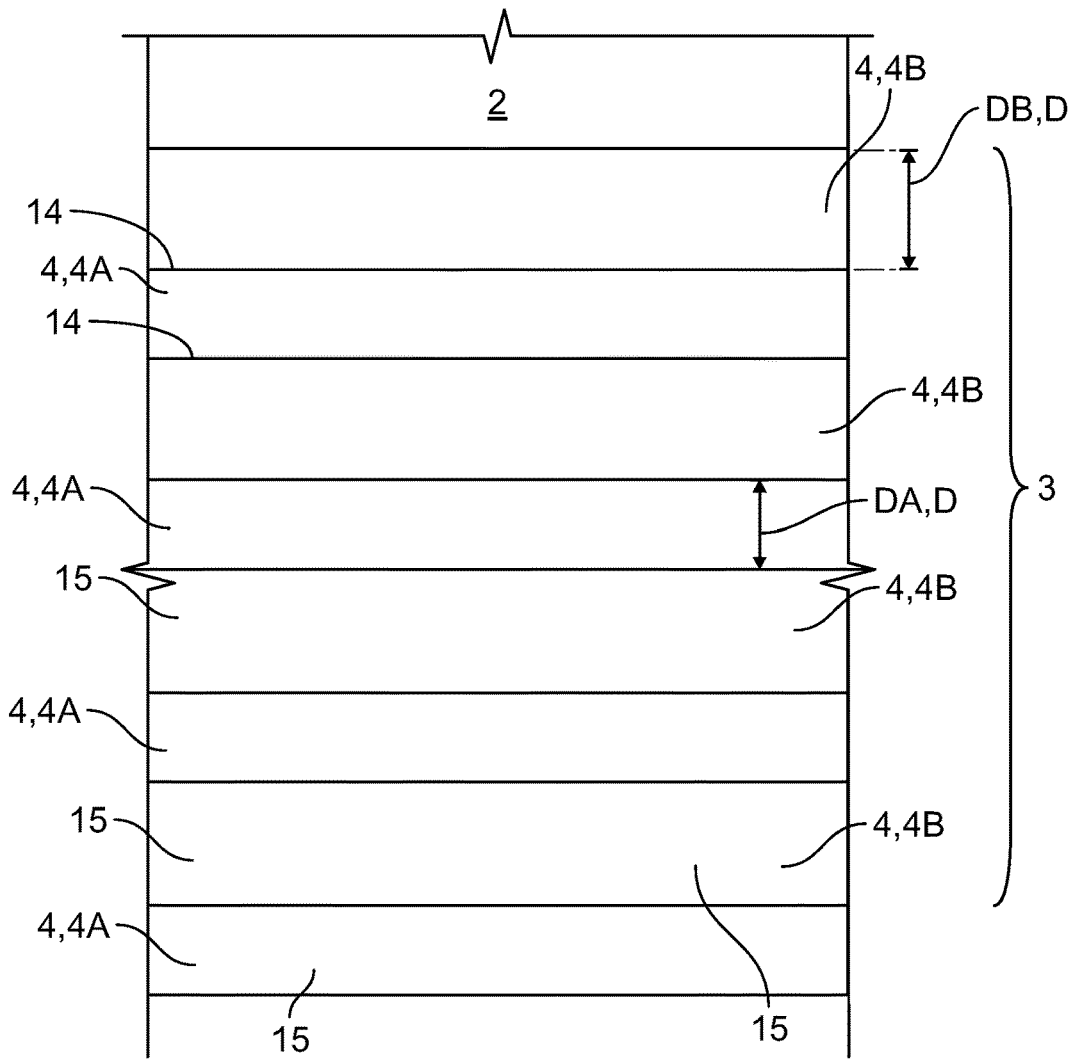
FIG. 2 is a sectional view of a cover layer of the sensor assembly.

The cover layer 3, as shown in FIG. 2, has several layers 4 including first and second layers 4A, 4B arranged over one another. The first and second layers 4A, 4B may be made of different materials. In the shown embodiment, the material of the first layer 4A is aluminum oxide and the material of the second layer 4B is magnesium oxide. Aluminum oxide and magnesium oxide, at temperatures <1400° C., react with one another in a thin boundary layer and form hybrid shapes where they border one another; in other embodiments, the first and second layers 4A, 4B may be formed of materials which exhibit no reactions or formations of hybrid forms, for example, spinel and magnesium oxide or zirconium dioxide and aluminum oxide. The boundary region 14 is small compared to the core region 15, so that overall the behavior of the core regions 15 dominates.

The magnesium oxide layers 4B and the aluminum oxide layers 4A, as shown in FIG. 2, are disposed in an alternating manner to keep strains between the individual layers low. Alternatively, it is also possible for two or more first layers 4A or second layers 4B to be arranged adjacent one another, onto which follow one or more second layers 4B or first layers 4A. This can be required, for example, if only layers of a particular thickness can be produced.

The sum of the thicknesses DB of the magnesium oxide layers 4B is approximately 70% of the sum of the thicknesses DA of the aluminum oxide layers 4A. As a result, the cover layer 3 has a thermal coefficient of expansion which is adapted to the thermal coefficient of expansion of the platinum measuring structure 2. The sum of the thicknesses of all magnesium oxide layers 4B may be between 60% and 80% of the sum of the thicknesses of all aluminum oxide layers 4A. In the case of other combinations of material, the percentage values can be adapted accordingly such that the weighted average of the thermal coefficients of expansion of the materials for the cover layer 3 approximately corresponds to the thermal coefficient of expansion of platinum.

The cover layer 3 can have a thermal coefficient of expansion which deviates by a maximum of approximately 10% from the thermal coefficient of expansion of platinum. In other embodiments, an even lower deviation of 5%, 3%, 2% or less can be selected. The thermal coefficients of expansion of the cover layer 3 and of the platinum measuring structure 2 can in particular deviate from one another within the specified ranges only in a region relevant for measuring, for example in a region in which the sensor assembly 7 is operated later, for instance from −50° C. to 1000° C. They may deviate further from one another outside such a region.

In an embodiment, the thickness DA, DB of the individual layers 4A, 4B is between 0.3 µm and 0.6 µm in each case.

As a result, no excessively large warping forces can build up between the layers 4A, 4B. At the same time, the boundary region 14 between the layers 4A, 4B is small compared to the thicknesses DA, DB of the layers 4A, 4B, which means that the core regions 15 of the layers 4A, 4B determine the behavior of the cover layer 3.

In the embodiment shown in FIG. 2, the cover layer 3 has eight layers 4. However, there can also be more or fewer layers 4 in the cover layer 3. In order to be able to produce the cover layer 3 efficiently and at the same time to obtain good functionality, a total of between 5 and 25 layers can be present. In another embodiment, approximately 5 to 10 layers are present. In an embodiment, the overall layer thickness of the cover layer is between 2 and 10 µm.

The embodiment of FIG. 2 also shows that the thickness DB of each individual magnesium oxide layer 4B is approximately equal and the thickness DA of each aluminum oxide layer 4A is approximately equal, however, these thicknesses DB or DA could also vary among the layers 4B or 4A, respectively.

Figure 3:
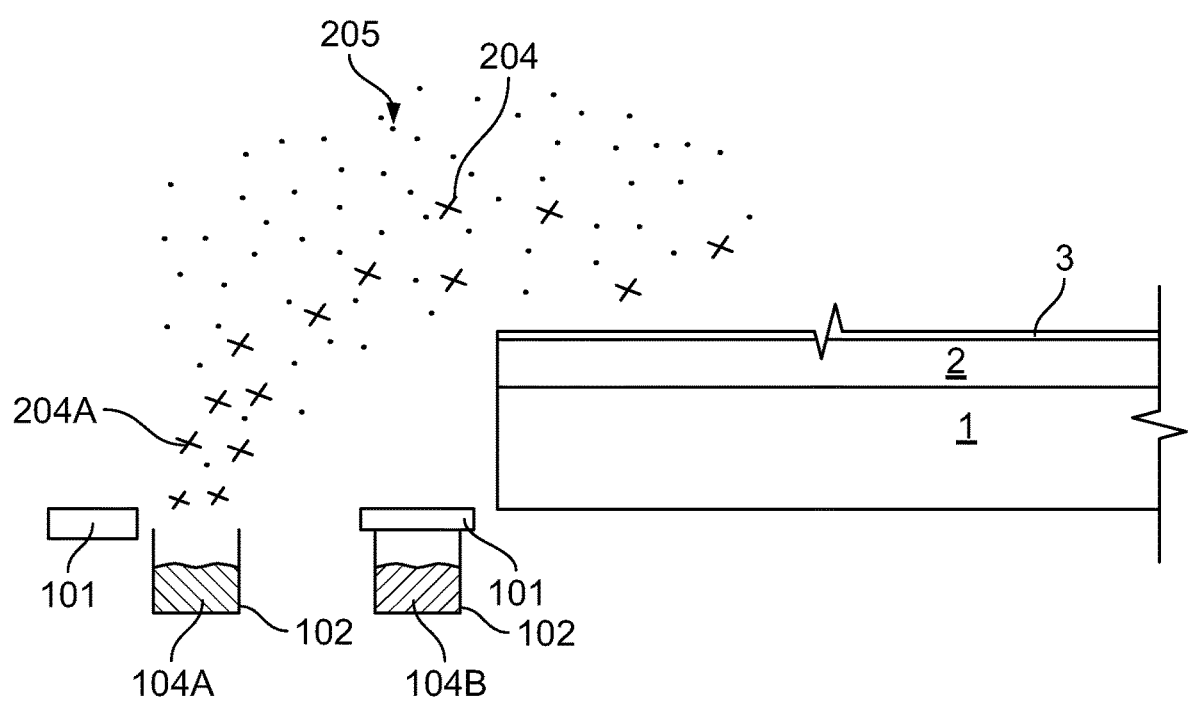
FIG. 3 is a schematic of a method of producing the cover layer.

A method of producing the cover layer 3 is shown in FIG. 3. The cover layer 3 is deposited on the sensor assembly 7, which hitherto comprises only the substrate 1 and the measuring structure 2. The cover layer 3 is deposited by means of alternating aluminum and magnesium sputter deposition. In order to generate a layer arrangement with sputter deposition, metal atoms 204 spurt out through plasma in an alternating manner from two different metal targets 102 and reach the surface of the sensor assembly 7. There they form, together with oxygen atoms from an oxygen atmosphere 205, a layer 4, 4A, 4B of the cover layer 3.

In the embodiment shown in FIG. 3, aluminum atoms 204A exit from the target 102 with a cover 101 opened and form an aluminum oxide layer 4A on the sensor assembly 7. After a desired thickness of the aluminum oxide layer 4A is reached, the target 102 with the aluminum 104A, for example, is closed and the target 102 with the magnesium 104B is opened. Magnesium atoms then exit accordingly and, together with the oxygen atmosphere 205, form a magnesium oxide layer 4B on the sensor assembly 7. This can be repeated multiple times until a corresponding number of layers 4, 4A, 4B is present. The sensor assembly 7 or even only the cover layer 3 can be brought to a higher temperature occasionally in order to anneal defects, for example, and to increase the quality of layer 4, 4A, 4B.

In other embodiments of the cover layer 3, a first layer 4 is partially or fully stabilized and a further layer 4 is constructed on the first layer 4 by depositing material in powder, paste or suspension form. The depositing of a ready-made layer 4 can also be employed. After a further stabilization step, a further layer 4 can be constructed on the second layer 4, and so on. In other embodiments of the substrate 1, more than two layers 4 made of more than two materials can be present. For example, three layers 4 made of three materials can be present, which with regard to their thicknesses are formed such that the weighted thermal coefficient of expansion of the three materials is in line with the thermal coefficient of expansion of the platinum.

Advantageously, in the sensor assembly 7 for a resistance thermometer according to the invention, the cover layer 3 has a thermal coefficient of expansion which is adapted to the thermal coefficient of expansion of the platinum measuring structure 2. Such a sensor assembly 7 is still reliable even after a long time because damage or tears due to different thermal coefficients of expansion are not to be expected. The solution according to the invention makes it possible to produce, in a simple manner, a sensor assembly 7 which is stable over the long term, in which, due to the adapted thermal coefficients of expansion, strains, and thus damage, barely occur; through the solution according to the invention, it is no longer necessary to find the correct mixing ratio through experiments. Furthermore, by depositing layers 4 with sputter deposition, the layers 4 are much denser than in the case of production using powders or pastes. Such layers 4 can offer better protection from external influences such as corrosive gases or liquids or dirt.

What is claimed is:

1. A sensor assembly for a resistance thermometer, comprising:
   a substrate;
   a measuring structure disposed on the substrate; and
   a cover layer disposed on a side of the measuring structure opposite the substrate, the cover layer having a plurality of first layers formed of a first material and a plurality of second layers formed of a second material, the first and second layers disposed over one another such that a thermal coefficient of expansion of the cover layer is adapted to a thermal coefficient of expansion of the measuring structure.

2. The sensor assembly of claim 1, wherein the measuring structure is made of platinum.

3. The sensor assembly of claim 1, wherein the first and second layers are disposed in an alternating manner.

4. The sensor assembly of claim 1, wherein two or more first layers are disposed adjacent one another and two or more second layers are disposed adjacent one another.

5. The sensor assembly of claim 1, wherein a total number of the first and second layers is between 5 and 25 layers.

6. The sensor assembly of claim 5, wherein the total number of the first and second layers is 8 layers.

7. The sensor assembly of claim 1, wherein the first material is aluminum oxide and the second material is magnesium oxide.

8. The sensor assembly of claim 7, wherein a sum of thicknesses of the second layers is approximately 70% of a sum of thicknesses of the first layers.

9. The sensor assembly of claim 1, wherein the first material is aluminum oxide and the second material is zirconium dioxide.

10. The sensor assembly of claim 1, wherein the first material is spinel and the second material is magnesium oxide.

11. The sensor assembly of claim 1, wherein a thickness of each of the first layers and each of the second layers is between 0.3 µm and 0.6 µm.

12. The sensor assembly of claim 1, wherein an overall thickness of the cover layer is between 2 and 10 µm.

13. A resistance thermometer, comprising:
   a sensor assembly having a substrate, a measuring structure disposed on the substrate, and a cover layer disposed on a side of the measuring structure opposite the substrate, the cover layer including a plurality of first layers formed of a first material and a plurality of second layers formed of a second material, the first and second layers disposed over one another such that a thermal coefficient of expansion of the cover layer is adapted to a thermal coefficient of expansion of the measuring structure.

* * * * *